No. 869,370. PATENTED OCT. 29, 1907.
C. DE HOFFMANN.
CONNECTING DEVICE FOR GAS CONDUITS.
APPLICATION FILED FEB. 23, 1904.
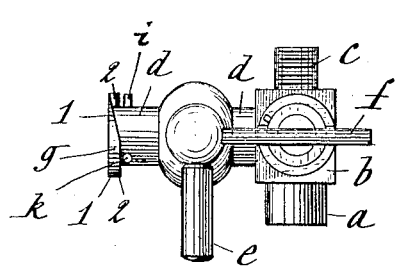
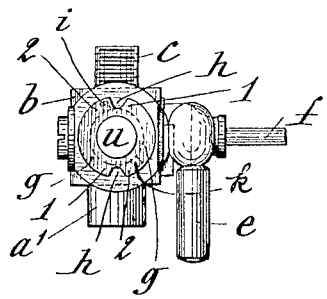
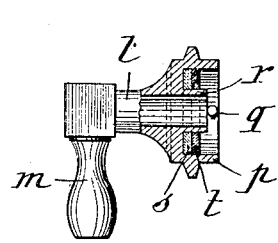
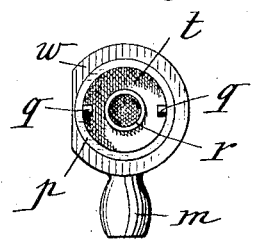
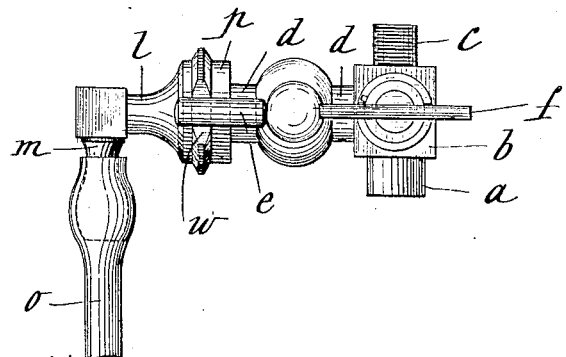

UNITED STATES PATENT OFFICE.

CHARLES DE HOFFMANN, OF BERGYCK, NETHERLANDS.

CONNECTING DEVICE FOR GAS-CONDUITS.

No. 869,370.   Specification of Letters Patent.   Patented Oct. 29, 1907.

Application filed February 23, 1904. Serial No. 194,890.

*To all whom it may concern:*

Be it known that I, CHARLES DE HOFFMANN, a subject of the Queen of Holland, and residing at Bergyck, in Netherlands, have invented certain new and useful Improvements in Connecting Devices for Gas-Conduits, of which the following is a specification.

This invention relates to an improved connecting device for the coupling of a removable or secondary gas pipe to the main gas pipe or conduit. This improved device has been specially devised for the connecting of by-passes to lighting apparatuses; it can however also be used for the connection to other parts of a gas conduit. This connecting device is characterized by its great safety being perfectly tight at the movable joint and the ease of attaching and detaching the second pipe by its aid; moreover the apparatus can be fixed in its position without resorting to the service of a plumber or other craftsman.

Although the present arrangement of the connecting device has been devised chiefly for use with a burner tube it may be readily applied to any other kind of gas connection.

Apparatus according to the present invention is illustrated in the accompanying drawings in which:—

Figure 1 is a front and Fig. 2 a side view of the fixed part of the connecting device i. e. that part of it which is to be permanently attached to the burner tube or the like. Said stationary part comprises a tubular body $a\ b\ c$, provided with a lateral branch pipe $d$ to which should be fitted the secondary pipe adapted to be used for carrying gas, for lighting, firing, heating, or other such purposes. This branch pipe has a cock $e$ regulating the auxiliary pipe, while the body $a\ b\ c$ has a cock $f$ regulating the burner or the like. The lower end of the body $a\ b\ c$ is tapped internally while its upper end is tapped externally. When this part is to be fixed to a lighting apparatus, to a mantle burner for instance, the Bunsen tube is first unscrewed and taken off and the part $a\ b\ c\ d$ is screwed on in its stead, the end $a$, being screwed home on to the tapped end of the gas tube; the Bunsen tube, previously screwed off, is now screwed on to the end $c$ of the connecting device and the whole burner is again placed on the Bunsen tube. The fitting being thus completed, the taps of the ordinary cock on the lighting apparatus should be now locked so as to be rendered immovable in its open position since it will be no longer required, the cock $f$ doing its work.

The arrangement of the connecting device proper between the stationary part and the removable part carrying the secondary pipe etc: consists in a kind of "bayonet joint" of special construction.

Fig. 3 shows a side view, partly in longitudinal section of the movable part of the connecting apparatus and Fig. 4 is a front view of same. The extremity of the tube $d$ on the stationary part carries a cam flange $g\ g$ having two recesses $h\ h$ in diametrically opposite position, placed preferably in the vertical plane passing through the stationary part to be fixed on the lighting apparatus. If seen from the side, the cam flange $g,\ g,'$ shows two inclined planes directed in the same way, i. e., so placed that the beginning or base $l$ of the one inclined plane, starts where the step 2 at the end of the inclined plane is ending, as shown in Figs. 1 and 2. On the left hand side of the upper recess $h$ is placed a pin $i$ and on the right hand side of the lower recess $h$ is situated a stop pin $k$ at a little over 180° in an anti-clockwise direction relatively to the pin $i$; said pin $k$ acts as the stop proper for the detachable connection. This movable part, Figs. 3 and 4, is composed of a tubular body, the parts $l\ m$ of which are usually placed at right angles to one another so that on the connection of the two parts being made, the secondary pipe $o$ fitted to $m$ will hang downwards (see Fig. 5).

The end of the part $l$ forms a cap $p$ (Figs. 3 and 4). Within this cap are two pins $q,\ q$, in diametrically opposed positions; a small tube $r$ forming the continuation of the inner channel in the body $l\ m$ projects slightly from the bottom of the cap; in the bottom of said cap is placed, around the tube $r$, a rubber washer $s$ upon which is a rigid fiber or vulcanite washer $t$, in such a way as to allow the projection $r$ to protrude a little.

When it is desired to connect the two parts the end of the tube $r$ is introduced into the part $d$ with the limb $m$ held horizontally, the pins $q$ entering the recesses $h$. The part $l$ is then turned in a clockwise direction until one of the pins $q$ meets the pin $k$; the connection is then made, the branch pipe being directed downwards as shown in Fig. 5. The hardness of the washer $t$ allows the two surfaces to undergo a large amount of friction without damaging the joint. Owing to the elasticity of the joint and the great pressure applied by means of the cam surfaces, a closing of perfect and absolute tightness is obtained.

On the movable part of the connecting device is a plane surface $w$ (Figs. 4 and 5) over which the handle of the cock $e$ slides, said handle thus forming in its open position (Fig. 5) a locking device for the movable part $l\ m$ and preventing the latter from being detached from $d$. To detach this movable part with its pipe, the cock must be shut, the part $l\ m$ may then be turned backwards, that is to say, to the left, so placing it in a horizontal position; the stop $i$ against which the pin $c$ then butts prevents $l\ m$ from being turned beyond said position; it also prevents turning the body $l\ m$ in the wrong direction, when the movable part is being fitted on the stationary part.

What I claim as my invention and desire to secure by Letters Patent is:—

1. In a gas pipe connection of the character described, the combination with a stationary tubular member comprising a tubular body adapted to be screwed upon a gas tube and a lateral branch pipe, a cock fitted to said branch pipe and controlling the flow of gas through the branch pipe, and a handle for said cock, of a tubular part adapted to be detachably secured to the said branch pipe by a rotative movement in one direction of said tubular part and having a body portion terminating in a hollow cap having an external plane surface with which latter the handle of the cock is adapted to engage and form a lock to prevent reverse rotation of the tubular part in the manner and for the purpose set forth.

2. In a gas pipe connection of the character described the combination with a stationary tubular member comprising a tubular body adapted to be screwed upon a gas tube and a lateral branch pipe for said body, a cam flange at the outer end of the said branch pipe and having diametrically arranged recesses, and pins on the said branch pipe arranged relatively to the recesses as described, of a detachable tubular part having a body portion terminating in a hollow cap and also having an enlarged central tubular portion projecting within the cap and adapted to enter the bore of the branch pipe of the stationary tubular member, diametrically arranged pins carried by the cap and adapted to enter the said recesses and engage with the cam flange and one of said pins adapted to engage with one of the pins on the branch pipe of the stationary tubular member, and washers arranged around the said central tubular projecting portion.

3. In a gas pipe connection of the character described the combination with a stationary tubular member comprising a tubular body adapted to be screwed upon a gas tube and a lateral branch pipe for said body, a cock fitted to said branch pipe and a handle for the said cock, a cam flange at the outer end of the said branch pipe and having diametrically arranged recesses and pins on the branch pipe arranged relatively to the recesses as described, of a detachable tubular part having a body portion terminating in a hollow cap and also having an enlarged central tubular portion projecting within the cap and adapted to enter the bore of the branch pipe of the stationary tubular member, diametrically arranged pins carried by the cap and adapted to enter the recesses in the cam flange and engage with the latter and one of said pins adapted to engage with one of the pins on the branch pipe of the stationary tubular member, and washers arranged around the said central tubular projecting portion, and a flatted external flange on the tubular cap with which engages the handle of the cock on the branch pipe of the tubular member in the manner and for the purpose specified.

In testimony whereof I have signed my name to this specification in the presence of two subscribing witnesses.

CHARLES DE HOFFMANN.

Witnesses:
F. DE HOFFMANN,
A. CHAERS.